Figure 1:
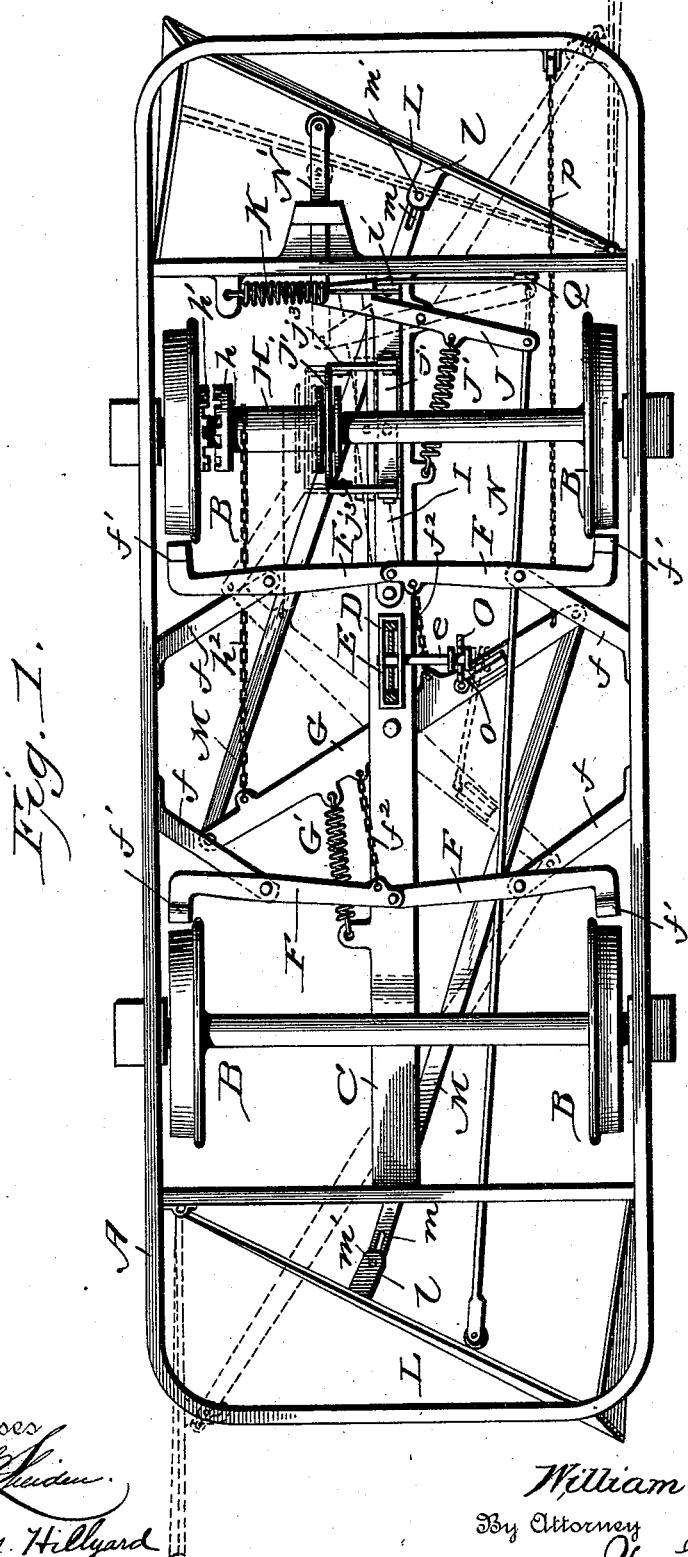

(No Model.) 2 Sheets—Sheet 1.

W. L. FITZHUGH.
CAR FENDER AND AUTOMATIC BRAKE.

No. 517,798. Patented Apr. 3, 1894.

Witnesses
Inventor
William L. Fitzhugh.
By Attorney
Van Buren Hillyard.

(No Model.) 2 Sheets—Sheet 2.
W. L. FITZHUGH.
CAR FENDER AND AUTOMATIC BRAKE.
No. 517,798. Patented Apr. 3, 1894.
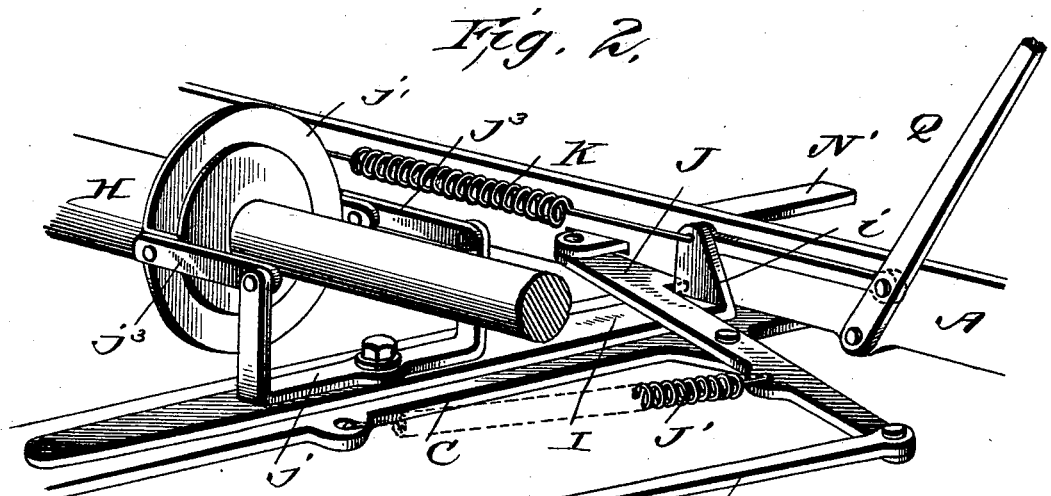
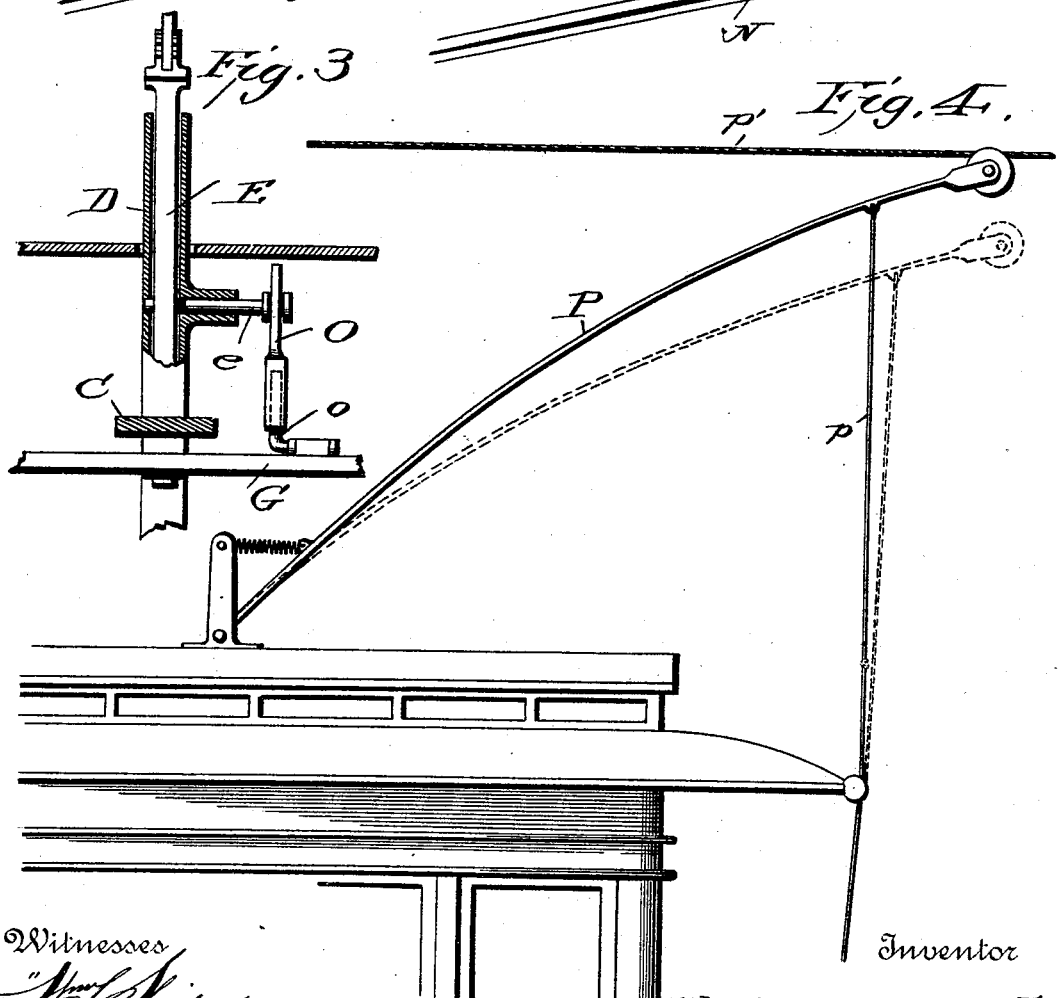
Witnesses
Inventor
William L. Fitzhugh.
By Attorney
Van Buren Hillyard.

UNITED STATES PATENT OFFICE.

WILLIAM LEE FITZHUGH, OF BALTIMORE, MARYLAND, ASSIGNOR, BY DIRECT AND MESNE ASSIGNMENTS, TO THE RUSS CAR FENDER COMPANY, OF WEST VIRGINIA.

CAR-FENDER AND AUTOMATIC BRAKE.

SPECIFICATION forming part of Letters Patent No. 517,798, dated April 3, 1894.

Application filed December 8, 1893. Serial No. 493,127. (No model.)

*To all whom it may concern:*

Be it known that I, WILLIAM LEE FITZHUGH, a citizen of the United States, residing at Baltimore, in the State of Maryland, have invented certain new and useful Improvements in Car-Fenders and Automatic Brakes; and I do hereby declare the following to be a full, clear, and exact description of the invention, such as will enable others skilled in the art to which it appertains to make and use the same.

This invention relates to car fenders and automatic brake mechanism chiefly designed for street railway cars which are propelled by cable, electric or other motive power dispensing with the use of horses.

The object of the invention is the provision of a fender or pilot board and operating mechanism connected therewith whereby when the said pilot board strikes an obstruction on the track it will be positively thrown outward and push the obstruction laterally from the track.

A further object of the invention is the provision of a brake mechanism, independent of the usual and ordinary brakes under the control of the motorman or gripman, which will be automatically thrown into active service by the impact of the said obstruction against the said pilot board to bring the car to a full stop before serious and fatal results will be accomplished.

A still further object of the invention is to automatically interrupt or cut off the motive power from the car by the same means and at the same time the pilot board and the brake mechanism are actuated, thereby rendering possible to stop the car in a comparatively it short distance. If the car is propelled by cable, the mechanism will be constructed to automatically release the cable gripping devices, if by trolley, either the overhead or underground system, to disconnect the trolley from the conductor, if by storage battery, steam, or other motive power, to disconnect, break the circuit, throttle or in any manner cut loose from or disengage the propelling mechanism or motive power so as to release the car from its influence. The fender, brake mechanism and the motive power releasing devices constitute an attachment and are separate from and have no connection with the ordinary hand operated system of brakes usually provided on street cars.

The invention consists of the novel features and the peculiar construction and combination of the parts which will be hereinafter more fully described and claimed and which are shown in the annexed drawings, in which—

Figure 1 is a top plan view of a car truck equipped with and embodying the invention, the operation of the parts being indicated by dotted lines. In this view the usual hand operated brakes are not shown to avoid confusion; but it will be understood that the same are applied in the ordinary manner. Fig. 2 is a detail perspective view showing the latch lever, the windlass shipping instrumentalities and the lever for re-setting the parts after the attachment has been operated. Fig. 3 is a detail view showing the devices for releasing the cable gripping mechanism, the latter being of the ordinary and well known construction. Fig. 4 is a detail view showing the manner of disconnecting the trolley from the conductor or overhead line wire so as to break the circuit when the car is operated by electricity.

The truck frame A is mounted on the wheels B in the usual manner and is of the type used for grip cars of the cable system, being provided with a central longitudinal beam C having the common standard D midway of its ends which supports the cable gripping devices of any pattern in the ordinary manner, the plate E carrying the said cable gripping devices (not shown) being attached to the standard D, by the pin $e$.

The brake beams F, a pair for the wheels at each end of the track, are pivotally supported between their ends, preferably to arms $f$ projecting from the side beams of the track, and have their inner ends connected together so that both brake beams of each pair will operate simultaneously. The brake shoes $f'$ at the outer ends of the brake beams $f$ are adapted to engage with the wheels and stop the car. A chain $f^2$ connects each pair of brake beams with an approximately transverse lever G which is pivoted between its ends to the beam C. Obviously, when the lever G is operated the brakes will be applied.

A drum H is loosely mounted on the axle of one of the wheels so as to relatively turn freely thereon and have a limited longitudinal movement to disengage the half clutch $h$ at one end thereof from a corresponding half clutch $h'$ on the axle, whereby the drum and the axle may be caused to revolve together and wind up a chain or cable $h^2$ which connects the said drum with the lever G. This chain or cable $h^2$ is not wound on the drum under normal conditions and will be wound thereon, only, when the said drum is turned in either direction no matter which way the car is moving. A lever I pivoted at one end to the beam C and extending parallel therewith has its opposite end $i$ bent at right angles to form a stop to be engaged by a catch or latch lever J by means of which the said lever is held in a predetermined position so as to hold the drum from positive engagement with the axle on which the said drum is mounted. This lever I has suitable attachment with the drum to operate and move the latter to and from the half clutch on the axle. The preferable means is a yoke $j$ pivoted to the lever I, a plate $j'$ fitted in an annular groove at the end of the drum, and links $j^3$ pivotally connected at their ends with said yoke and plate. A spring K is provided to operate the lever I the instant it is released from the catch J to move the drum and engage the half clutches $h$ and $h'$ to cause a revolution of the drum and a winding of the chains $f^2$ to automatically apply the brakes.

The fenders or pilot boards L are pivoted at one end to the end beams of the truck and extend obliquely across the track from one side to the other of the truck. These fenders are padded to prevent injurious contact with persons and have projections $l$ on the inner side which have a limited loose connection with rods M extending to and pivotally connected with the ends of the lever G. This loose connection is formed by slots $m$ in the outer ends of the rods M and pins or bolts $m'$ passing through the said slots and the projections $l$. Push rods N and N' connect with the opposite ends of the latch lever J and extend close to the fender or pilot boards so as to be operated thereby when an obstruction is struck to release the lever I whereby the drum H is clinched to the axle and caused to revolve therewith to set the brakes, push the fenders or pilot boards outward, and disconnect the motive power.

A bent rod $o$ connects the lever G with a short bar O which has connection with the pin $e$ so as to withdraw the latter on operating the lever G thereby releasing the plate E and the cable gripping devices as hereinbefore set forth.

For a trolley system, the trolley arm P is connected by a chain or cord $p$ with the said lever G so as to be drawn thereon when the lever G is operated to break the circuit by disconnecting the trolley from the conductor or line wire $p'$. The latch lever J is held and returned to an operative position after being released by a spring J'. The lever G is operated upon by a spring G' to hold the same and return it to a normal position after being actuated. To reset the parts a lever Q, under the control of the gripman or motorman, is connected with the lever I. By operating this lever Q the lever I is returned to a normal position and the drum H freed from its axle. The spring G' regaining itself returns the lever G, the pilot boards, and the brake mechanism to their original positions as will be readily understood.

It has been proposed to pivot pilot boards to a car and provide a spring to operate the same when the catch devices are released by impact of the pilot board or a portion of the catch mechanism with an obstruction. Such construction is not claimed and is objectionable because the sudden action of the released spring added to the motion of the car will impart a resultant movement to the pilot board calculated to bring about serious results. In the present instance the outward or sweeping movement of the pilot board is proportionate to the forward movement and the momentum of the car and is actuated solely by the force derived from the inertia of the moving car.

Having thus described my invention, what I claim, and desire to secure by Letters Patent, is—

1. The combination of a pilot board adapted to yield when engaged by an obstruction on the track, a lever adapted to be positively operated from an axle of the truck, a releasing and clutch mechanism actuated by the yielding of the pilot board to operatively connect the said lever with the axle, connections between the said lever and the pilot board whereby the latter is thrown outward, a brake mechanism, and motive power disconnecting devices actuated from the said lever, simultaneously with the outward movement of the pilot board, substantially as set forth.

2. The combination with a pilot board adapted to swing outward, a drum, a clutch mechanism between an axle of the car truck and the said drum, and connections between the said drum and the pilot board, of a counterbalanced lever for throwing the said clutch mechanism in gear, and a latch lever for holding the clutch mechanism out of gear by engagement with the said counterbalanced lever, and adapted to be released by impact of the pilot board with an obstruction, substantially as described for the purpose specified.

3. The combination with the pilot board adapted to swing outward, a drum, and a clutch mechanism between the said drum and an axle of the truck, of a lever having connection with the said drum, a rod forming connection between the said lever and the pilot board and constructed to permit of a slight inward movement of the said pilot board when the latter is struck a counter-balanced clutch operating lever, and a latch lever adapted to be released by the inward movement of the pilot board, substantially as described.

4. In combination a pivoted pilot board, a brake mechanism, a transverse lever having connection with the said pilot board and brake mechanism, a drum for operating the said transverse lever, a clutch mechanism between the said drum and an axle of the truck, a counterbalanced clutch operating lever, a latch lever for engagement with the counterbalanced lever to hold the clutch out of gear, a push rod to be operated from by the pilot board to release the said latch lever, a re-setting lever under the control of the motor or gripman, and provisions having attachment with the said transverse lever for automatically disconnecting the car from its propelling mechanism, substantially as specified.

5. In combination with a railway car, a movable pilot board carried by the car, a trip device operated by impact with an obstruction on the track, a pilot board actuating mechanism, and a clutch operated by the trip device to gear the said pilot board actuating mechanism with an axle of the car, whereby the momentum or forward movement of the said car is utilized to move the pilot board to remove the obstruction from the path of the car, substantially as described.

6. In combination with a railway car, a movable pilot board pivoted at one end to the car, a trip device operated by impact with an obstruction on the track, a pilot board actuating mechanism, and a clutch operated by the trip device to gear the said pilot board actuating mechanism with an axle of the car, whereby the momentum or forward movement of the said car is utilized to sweep the pilot board across the path of the car, substantially as set forth.

7. In combination with a railway car, a pilot board pivoted at one end to the car and extending across the tracks, a trip device operated by impact with an obstruction on the track, a pilot board actuating mechanism, and a clutch operated by the trip device to gear the said pilot board actuating mechanism with an axle of the car, whereby the momentum or forward movement of the said car is utilized to sweep the pilot board across the path of the car, substantially as specified.

8. In combination a railway car, and mechanical propelling means, a movable pilot board carried by the car, trip mechanism operated by impact with an obstruction on the track, a pilot board actuating mechanism, and a clutch operated by the trip device to gear the said pilot board actuating mechanism with an axle of the car to utilize the forward movement of the car to release it from its propelling mechanism, substantially as described.

9. In combination with a railway car, and propelling means therefor, of a movable pilot board carried by the car, trip mechanism operated by the impact of the pilot board with an obstruction on the track, a pilot board actuating mechanism, and a clutch operated by the trip device to gear the said pilot board actuating mechanism with an axle of the car to utilize the forward movement of the car to move the pilot board and also release the car from its propelling means, substantially as described for the purpose specified.

In testimony whereof I affix my signature in presence of two witnesses.

WILLIAM LEE FITZHUGH.

Witnesses:
VAN B. HILLYARD,
WM. A. EASTERDAY.